United States Patent
Cheng

(10) Patent No.: US 6,170,615 B1
(45) Date of Patent: Jan. 9, 2001

(54) BRAKING DEVICE OF A THREE WHEEL BABY CAR

(76) Inventor: Hui-Fen Cheng, 58, Ma Yuan West St., Taichung (TW)

( * ) Notice: Under 35 U.S.C. 154(b), the term of this patent shall be extended for 0 days.

(21) Appl. No.: 09/277,554

(22) Filed: Mar. 29, 1999

(51) Int. Cl.[7] .................................................. B62B 9/08
(52) U.S. Cl. ............................... 188/20; 188/31; 188/69; 280/642; 280/47.38
(58) Field of Search ................................ 188/20, 19, 2 F, 188/31, 69; 267/5; 280/642, 47.38

(56) References Cited

U.S. PATENT DOCUMENTS

| 482,708 | * | 9/1892 | Watkins | ................................... 188/20 |
| 5,460,399 | * | 10/1995 | Baechler et al. | ..................... 280/650 |
| 5,865,457 | * | 2/1999 | Knabusch et al. | ................ 280/304.1 |

* cited by examiner

Primary Examiner—Matthew C. Graham
Assistant Examiner—Bradley King

(57) ABSTRACT

A braking device of a three wheel baby car is disclosed. When a moving baby car is desired to be braked, the user only needs to move the protrusion of the braking device between the two rear wheel so as to drive the ejecting notches on the edge of long axis of a rotary portion within the braking device to engage with the inner ends of braking ejecting rods on the two sides. Thus, the original long axis contact with the inner end of the braking ejecting rod is changed as short axis contact. As a result, the braking rods on the two sides will be pushed outwards so that the two ends of the braking ejecting rod directly runs across the respect groove formed on the rear wheels. Accordingly, by this braking device, the baby car will be braked steadily.

1 Claim, 5 Drawing Sheets

BRAKING DEVICE OF A THREE WHEEL BABY CAR

BACKGROUND OF THE INVENTION

1. Field of the Invention

The present invention relates to a braking device of a three wheel baby car, by which, the baby car may be braked steadily and easily.

2. Background of the Invention

In general, in order to brake a baby car so that it can stand still in the original place, a braking device is mounted on each wheel frame. If the baby car is necessarily to be braked, the user treads the braking devices on the two wheel frames. Another, if the baby car is required to be pushed, user needs to push upwards the braking device to release the baby cars. But this device is inconvenient, the user must brake two braking devices on the two rear wheels. If there is a device, by which the user only need one action to brake the two wheels simultaneously, then the user will feel convenient and easily.

SUMMARY OF THE INVENTION

Accordingly, the object of the present invention is to provide a braking device of a three wheel baby car, wherein a moving baby car is desired to be braked, the user only needs to move the protrusion of the braking device between the two rear wheel so as to drive the ejecting notches on the edge of long axis of a rotary portion within the braking device to engage with the inner ends of braking ejecting rods on the two sides. Thus, the original long axis contact with the inner end of the braking ejecting rod is changed as short axis contact. As a result, the braking rods on the two sides will be pushed outwards so that the two ends of the braking ejecting rod directly runs across the respect groove formed on the rear wheels. Accordingly, by this braking device, the baby car will be braked steadily.

The present invention will be better understood and its numerous objects and advantages will become apparent to those skilled in the art by referencing to the following drawings in which:

Another object of the present invention is to provide a braking device assembled at a three wheel baby car. Thereby, if the baby car is required to be braked, the user is only necessary to move a rotary portion, then the baby car will be braked easily.

DETAILED DESCRIPTION OF THE PREFERRED EMBODIMENT

Figure 1:
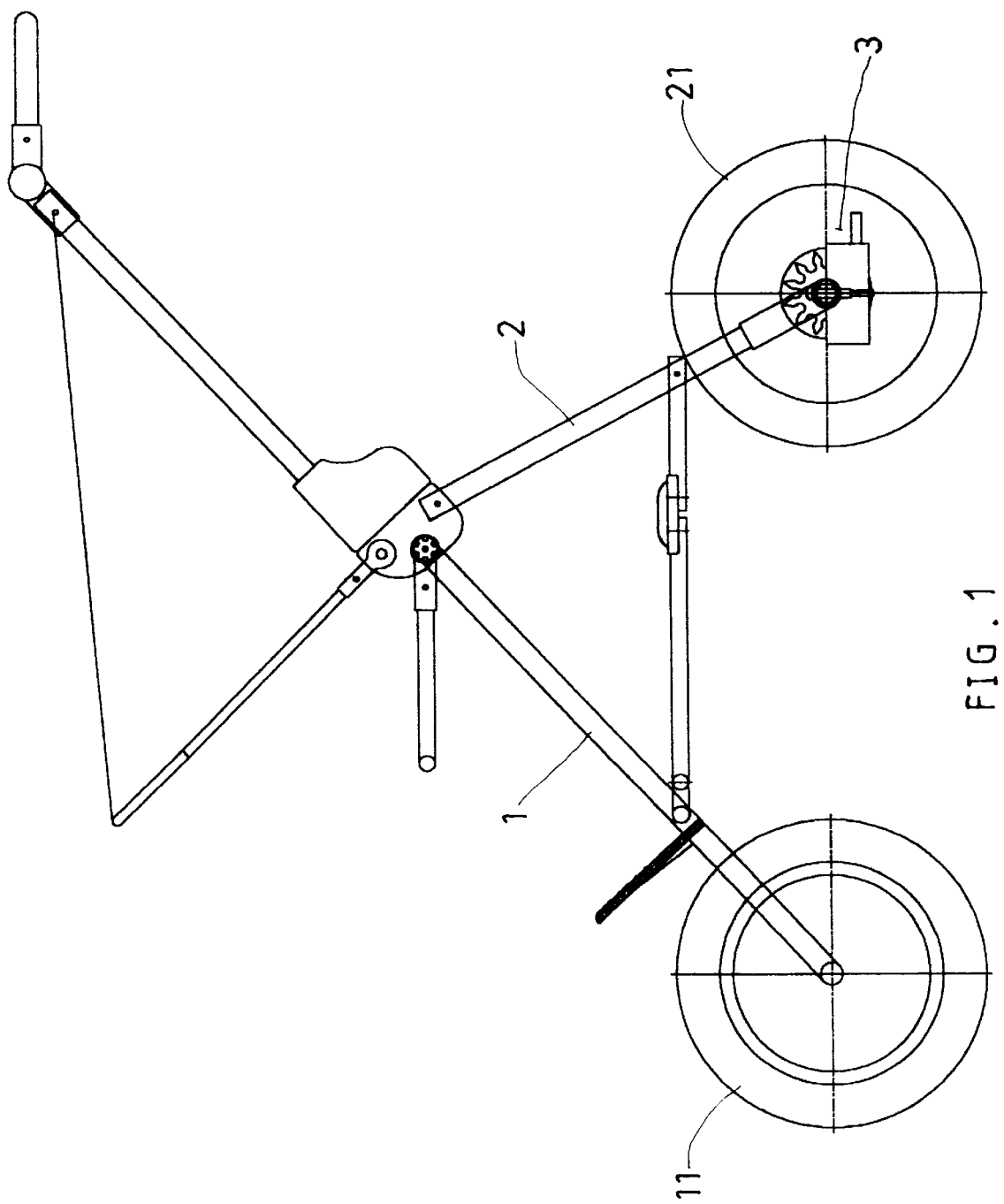
FIG. 1 shows the assembled positions of the braking device according to the present invention.
Figure 2:
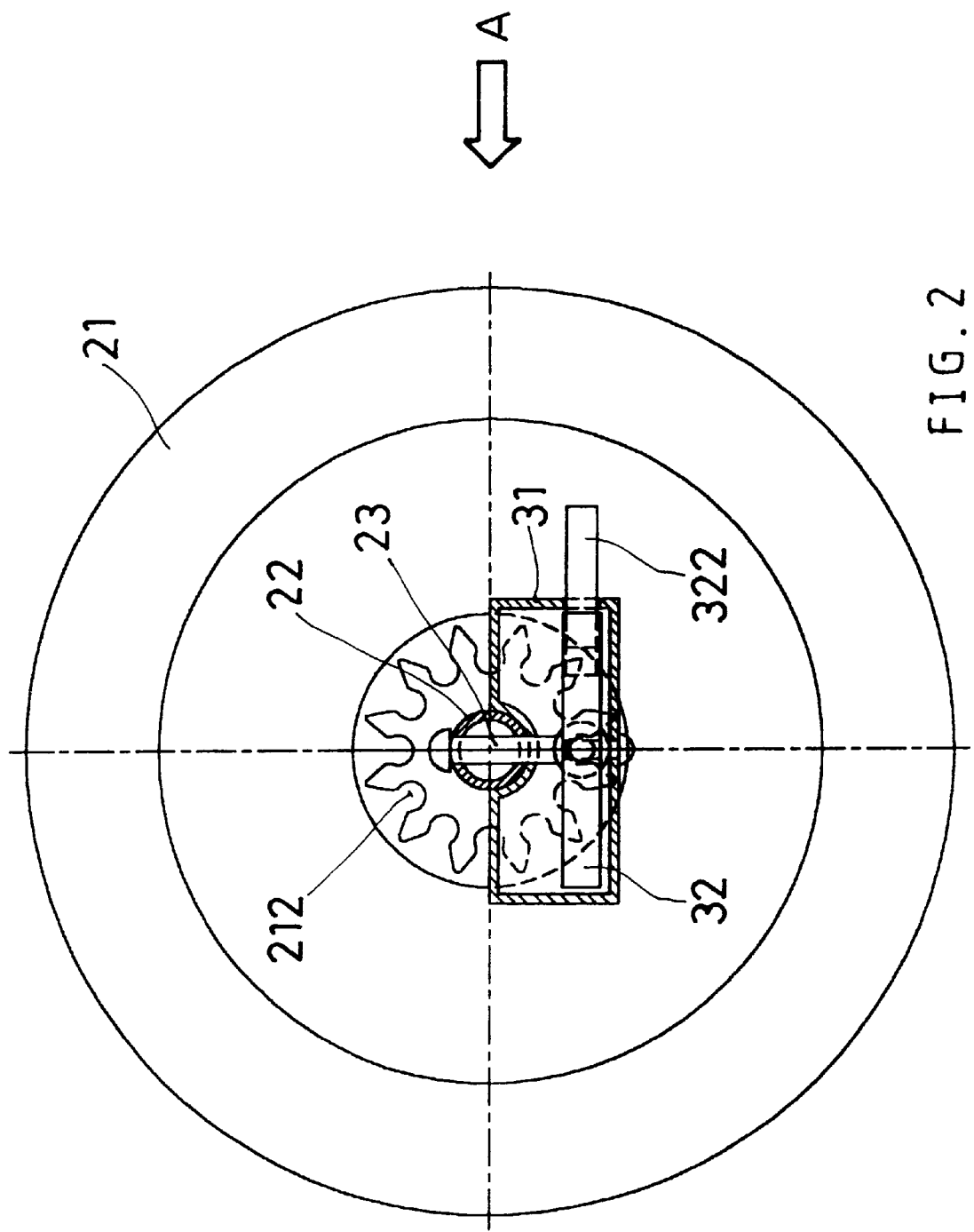
FIG. 2 is a cross sectional view showing the connection of the braking device and the axial rod of the rear wheels.
Figure 3:
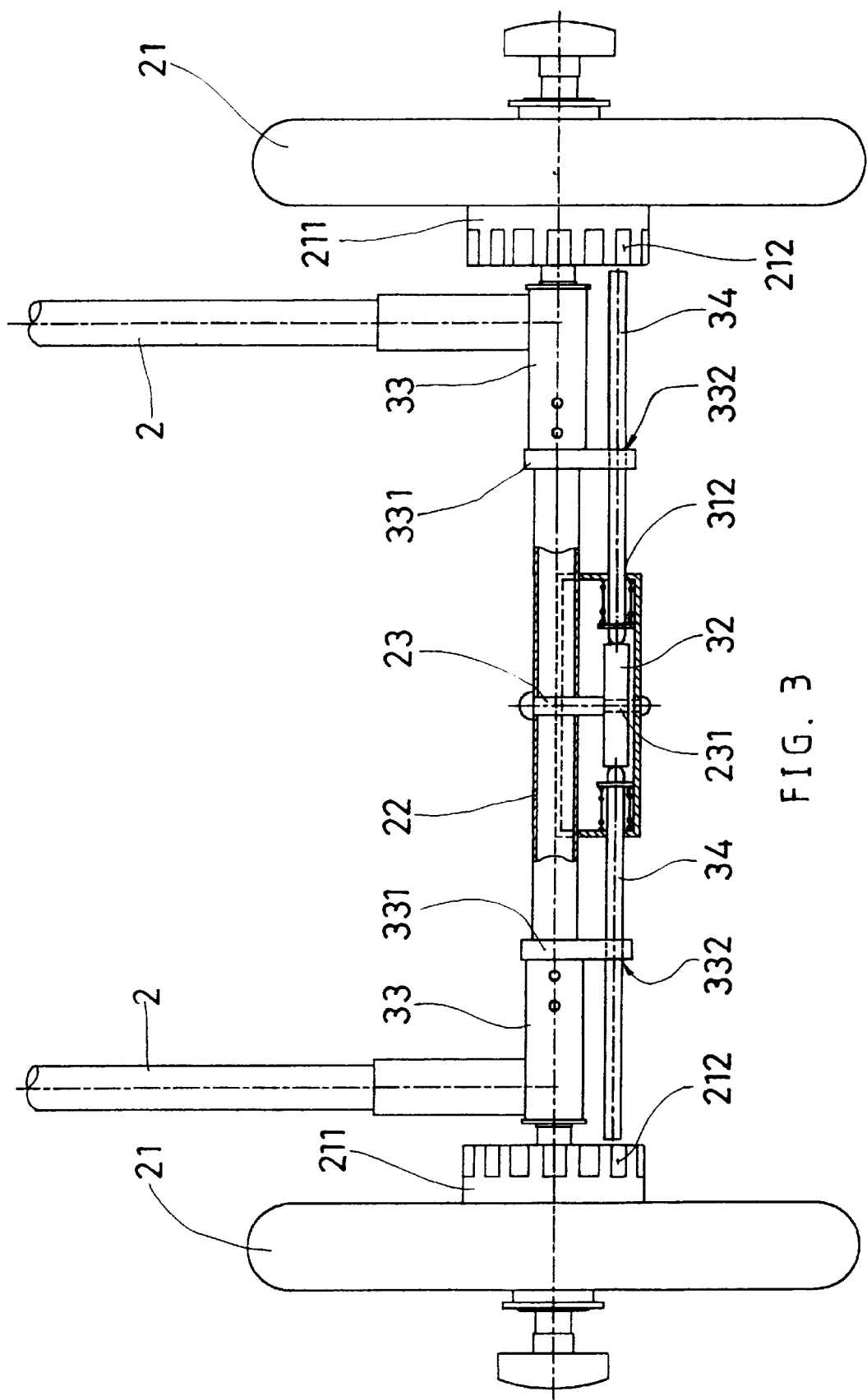
FIG. 3 is a rear view showing the connection of the braking device and the axial rod of the rear wheels.

With reference to FIG. 1, in the braking device (3) of the present invention, the lower ends of the supporting frames (1) and (2) of the baby car are assembled with the front and rear wheels (11) and (21), and then it is positioned on the axial rod (22) of the rear wheels (21) on the two sides thereof.

Along the middle portion of the axial rods (22) of the rear wheels (21), a hollow bearing portion (31) is assembled by a rivet fixing element (23). The rivet fixing element (23) is engaged with a rotary portion (32) (in this embodiment, it has an oblong shape) by the connection section (231) of a bearing portion (31). Two ends of the long axis of the rotary portion (32) have concave ejecting notches (321) and an end of the short axis of the rotary portion (32) has a protrusion (322). The protrusion (322) can extend outwards from the through hole (311) on the rear side of the hollow bearing portion (31).

A connecting piece (33) is formed on the connection between the axial rod (22) of the rear wheel (21) and the rear supporting frames (2) on the two sides of the baby car. The action end of receiving pieces (33) on the two sides thereof are extended with flange portions (331) of through holes (332). From the flange portion (331) of the through hole (332), it can pass through the braking ejecting rod (34) having a predetermined length. The inner end of the braking ejecting rod (34) can be inserted into the hole (312) of the hollow bearing portion (31). A confining ring (341) is installed on the inner section of the ejecting rod (34). The confining ring (341) serves to resist against the elastic element (342) between the 1o ejecting element (34) which is engaged with the inner side of the bearing portion (31) so that the braking ejecting rod (34) passing through from the side is retained to elastically resist against the periphery of the rotary portion (32). While two rear wheels (21) assembled on the two sides of the rear axial rod (22) are positioned with respect to the periphery of inner wheel rim (211) and have a plurality of grooves (212) with a radiating arrangement for matching with the receiving piece (33) disposed along the axial rod (22) so the braking ejecting rod (34) being inserted by the flange portion (331) on one side thereof will properly run across any groove (212).

Figure 5:
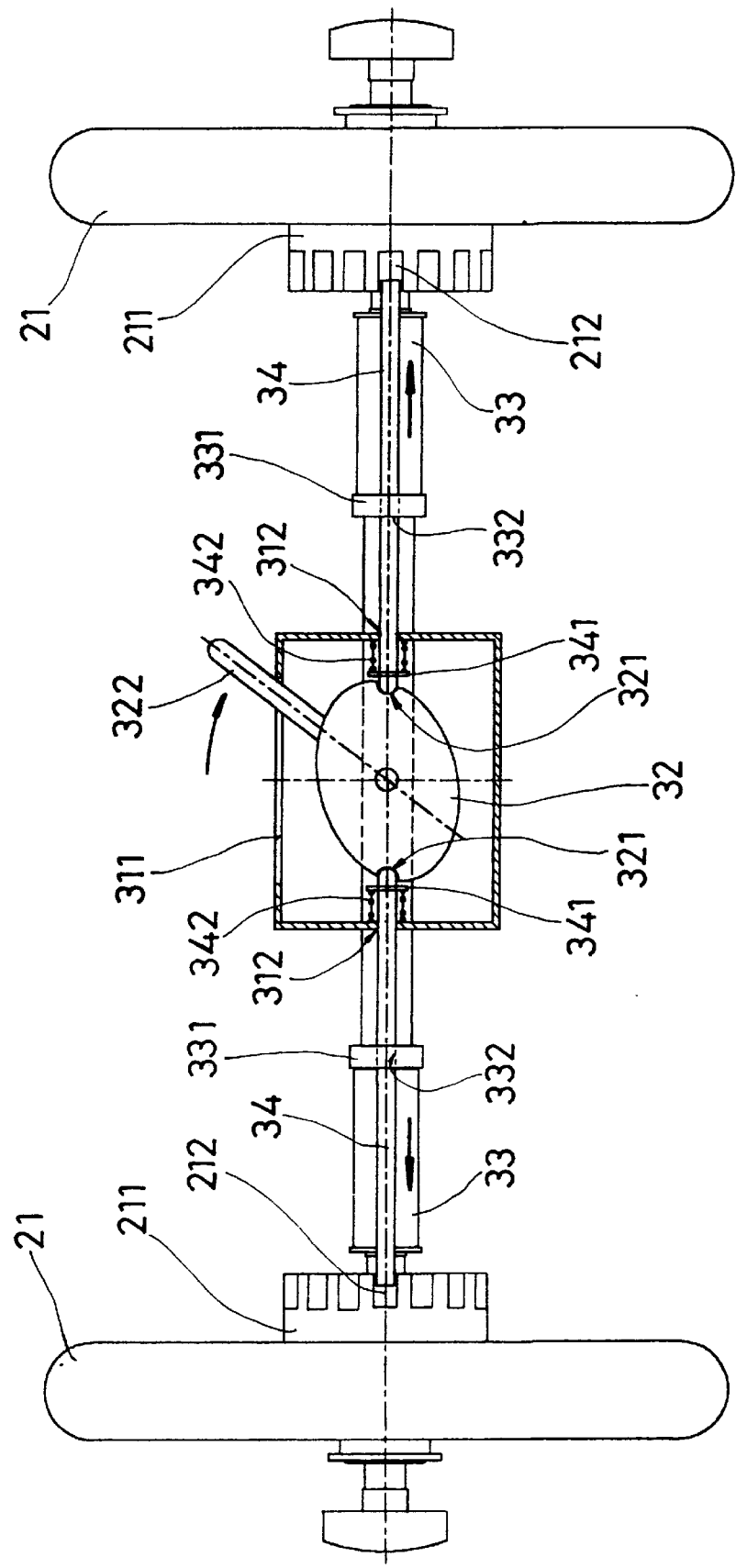
FIG. 5 is a bottom view of the braking device according to the present invention (braked).

In the braking device (3) of the three wheel baby car according to the present invention, if it is necessary to be braked temporarily, as shown in FIG. 5, the user's leg may move the protrusion (32) projected from the bearing portion (31) between the two rear wheels (21) to one side so that the maximum extreme periphery of rotary portion (32) in the bearing portion (31) is arranged transversally, and thus the ejecting notch (321) on the maximum extreme periphery thereof is exactly engaged with the braking ejecting rod (34). Therefore, the two braking ejecting rods (34) will be ejected outwards so that another side will run across the groove (212) on the respect end of the two rear wheels (21). Accordingly, the baby car is braked steadily.

Figure 4:
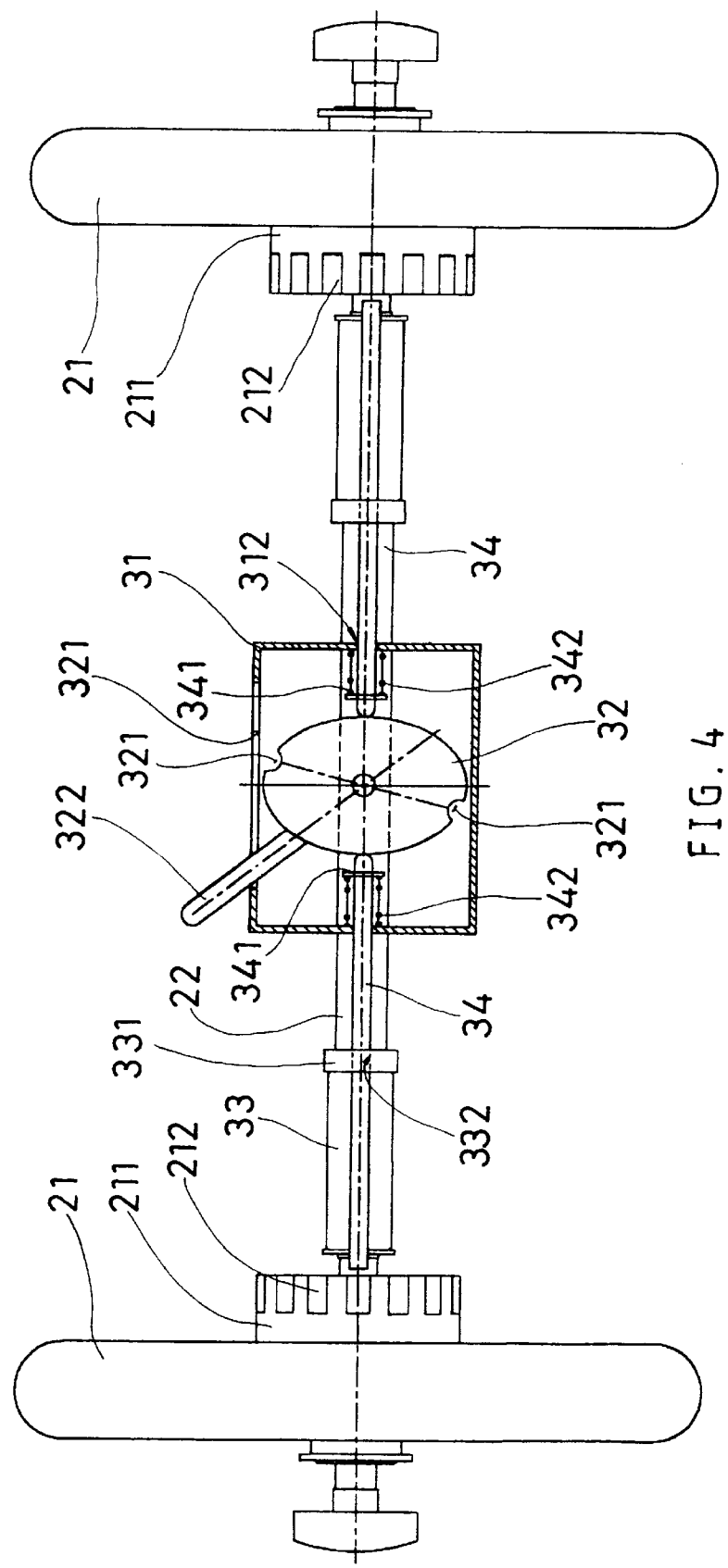
FIG. 4 is a bottom view of the braking device according to the present invention (not braked).

Inversely, if the protrusion (322) projected from the bearing portion (31) is moved inversely. Then, the maximum extreme periphery of the rotary portion (32) will move as shown in FIG. 4, and meanwhile, the ejecting notch (321) will separate with the braking ejecting rod (34). Then, the elastic element (342) between the bearing portions (31) will apply a restoring force thereto so as to eject against the outer periphery of the rotary portion (32). Thus, the baby car will return to the normal moving state.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A braking device of a three wheel baby car assembled on an axial rod of two rear wheels, which is used to brake the rear wheels of the baby car, characterized in that:

along a middle portion of the axial rod of the rear wheels of the baby car, a hollow bearing portion is assembled by a rivet fixing element, the rivet fixing element is engaged with a rotary portion by a connection section of the hollow bearing portion, a maximum extreme periphery of the long axis of the rotary portion has concave ejecting notches and one end of the short axis of the rotary portion has a protrusion, the protrusion extends outwards from a through hole on the rear side of the hollow bearing portion; connecting pieces are formed on a connection between the axial rod of the rear wheels and rear supporting frames on the two sides of the baby car, an end of the connecting pieces on the two sides thereof are extended with flange portions having through holes; braking ejecting rods having a predetermined length extend through the through holes of the flange portions, the inner end of each of the braking ejecting rods extends into the hollow bearing portion, a confining ring is installed on the inner end of each of the ejecting rods, the confining ring serves to resist against an elastic element which is engaged with an inner side of the the hollow bearing portion so that the braking ejecting rod passing through from the side is retained to elastically resist against the periphery of the rotary portion, while the two rear wheels assembled on the two ends of the rear axial rod are positioned with respect to the periphery of inner wheel rims having a plurality of grooves which match with the connecting pieces disposed along the axial rod so the braking ejecting rod being inserted through the flange portion on one side thereof will properly run across any groove;

wherein a user's leg moves the protrusion projected from the bearing portion to one side so that the maximum extreme periphery of the rotary portion in the hollow bearing portion is arranged transversely, and thus the ejecting notches on the maximum extreme periphery thereof are exactly engaged with the braking ejecting rods, therefore, the two braking ejecting rods will be ejected outwards so that another end of each braking ejecting rod will run across the groove on the inner wheel rim of each of the two rear wheels respectively, accordingly, the baby car is braked steadily.

* * * * *